US005904734A

United States Patent [19]

Friberg et al.

[11] Patent Number: 5,904,734
[45] Date of Patent: May 18, 1999

[54] METHOD FOR BLEACHING A HARD SURFACE USING TUNGSTEN ACTIVATED PEROXIDE

[75] Inventors: Stig E. Friberg, Pottsdam, N.Y.; Bijaya K. Mishra, Orissa, India

[73] Assignee: S. C. Johnson & Son, Inc., Racine, Wis.

[21] Appl. No.: 08/745,164

[22] Filed: Nov. 7, 1996

[51] Int. Cl.[6] ................................ D06L 3/02; C11D 3/39; C11D 7/54; C01B 15/00

[52] U.S. Cl. ......................... 8/111; 510/311; 252/186.33; 252/186.43

[58] Field of Search ......................... 252/186.27, 186.28, 252/186.3, 186.33, 186.38, 186.43; 510/311; 162/78, 79; 8/111

[56] References Cited

U.S. PATENT DOCUMENTS

| | | | |
|---|---|---|---|
| 2,287,064 | 6/1942 | Reichert et al. | 252/186.38 |
| 2,630,456 | 3/1953 | Bell et al. | 15/410 |
| 3,290,245 | 12/1966 | Elliott et al. | 52/157 |
| 3,398,096 | 8/1968 | Das et al. | 510/368 |
| 3,939,170 | 2/1976 | Randell et al. | 546/261 |
| 3,969,257 | 7/1976 | Murray | 252/186.38 |
| 4,119,557 | 10/1978 | Postlethwaithe | 8/111 |
| 4,182,716 | 1/1980 | Znotins et al. | 549/14 |
| 4,238,192 | 12/1980 | Kandathil | 8/111 |
| 4,427,490 | 1/1984 | Eckert | 162/78 |
| 4,562,276 | 12/1985 | Venturello et al. | 556/20 |
| 4,568,477 | 2/1986 | Oakes | 252/186.41 |
| 4,601,845 | 7/1986 | Namnath | 252/186.38 |
| 4,620,935 | 11/1986 | Baxter et al. | 252/186.33 |
| 4,654,159 | 3/1987 | Bush et al. | 562/583 |
| 4,728,455 | 3/1988 | Rerek | 252/186.38 |
| 4,922,014 | 5/1990 | Papenfuhs | 562/418 |
| 4,922,024 | 5/1990 | Bowman et al. | 564/480 |
| 5,045,121 | 9/1991 | Hoffman et al. | 134/39 |
| 5,061,396 | 10/1991 | Lovin et al. | 510/361 |
| 5,158,700 | 10/1992 | Sotoya et al. | 252/186.38 |
| 5,183,584 | 2/1993 | Coleman | 252/186.38 |
| 5,194,416 | 3/1993 | Jureller et al. | 502/167 |
| 5,241,077 | 8/1993 | Oakes et al. | 548/477 |
| 5,279,758 | 1/1994 | Choy | 510/370 |
| 5,330,677 | 7/1994 | Sotoya et al. | 252/186.38 |
| 5,342,542 | 8/1994 | Burzlo et al. | 252/186.39 |
| 5,460,747 | 10/1995 | Gosselink et al. | 252/186.38 |
| 5,651,917 | 7/1997 | Bridges et al. | 252/186.41 |
| 5,703,034 | 12/1997 | Offshack et al. | 510/376 |
| 5,753,599 | 5/1998 | Coope et al. | 510/116 |
| 5,785,886 | 7/1998 | Kerschner et al. | 252/186.33 |

*Primary Examiner*—Joseph D. Anthony

[57] ABSTRACT

Disclosed herein are bleaching systems that contain a peroxide and an activator. The activator is a tungsten containing compound, preferably sodium tungstate or tungstosilicic acid. When such bleaching systems are applied in an aqueous alkaline environment they can bleach mold, fungus, and the like.

4 Claims, No Drawings

METHOD FOR BLEACHING A HARD SURFACE USING TUNGSTEN ACTIVATED PEROXIDE

TECHNICAL FIELD

The present invention relates to cleaning compositions that contain peroxide. These compositions can be used to remove organic and other stains from various hard surfaces and textiles.

BACKGROUND ART

Peroxides are known bleaching agents. They can be supplied as hydrogen peroxide itself, or by using a hydrogen peroxide "generator" such as a perborate, a percarbonate, a peroxyurea compound, persilic acid and hydrogen peroxide adducts of pyrophosphates, citrates, sodium sulfate and sodium silicate. Such generators readily release hydrogen peroxide in aqueous solution.

However, such peroxides achieve only moderate bleaching when used by themselves in an aqueous environment. Better results have been achieved when they are used with activators. See e.g. U.S. Pat. Nos. 3,398,096, 4,119,557 and 5,460,747. The disclosure of these patents, and of all other publications referred to herein, are incorporated by reference as if fully set forth herein.

Unfortunately, such activators present their own problems. Some activators are susceptible to storage instability. Others are expensive to produce or are highly toxic. Others provide only minor improvements in bleaching effectiveness.

In unrelated work, it has been determined that a tungstate can catalyze the oxidation of secondary amines with hydrogen peroxide (H. Mitsui, J. Chem Soc. Chem. Comm. 874 (1984)), and that an in acid environment certain tungsten containing compounds used with peroxides can help process pulp (U.S. Pat. No. 4,427,490).

However, hard surface stains in buildings and on materials to be used for manufacturing are often caused by mold/fungus, and such stains can be resistant to bleaching by acidic cleaners. Similarly, stains on non-woven and woven textiles can be resistant to bleaching by conventional cleaning compositions. Moreover, peroxides can have stability problems during storage, and especially in alkaline environments.

Thus, a need exists for improved activators for use in alkaline peroxide bleaching systems.

DISCLOSURE OF INVENTION

In one aspect, the invention provides a bleaching system having a peroxide and a tungsten containing activator. The system operates best at an alkaline pH, preferably at between pH 8.0 and pH 10.99.

Preferred bases to be used with these systems are alkali metal hydroxides, alkali metal carbonates, alkali metal borates, alkali metal phosphates, alkali metal citrates, organo carboxylated citrates, ammonia, and alkali metal salts of polyacrylic acid. Alternatively, the tungsten containing activator can itself be a weak base (e.g. sodium tungstate).

In one form, the peroxide is selected from the group consisting of hydrogen peroxide, percarbonates, perborates, and hydrogen peroxide adducts of pyrophosphates, citrates, sodium sulfate, urea and sodium silicate, and mixtures thereof. The activator is preferably selected from the group consisting of sodium tungstate (e.g. provided in the dihydrate form: $Na_2WO_4 \cdot 2H_2O$) and tungstosilicic acid (a/k/a silicotungstic acid: $H_4[SiO_4(W_3O_9)_4]$). However, other tungsten containing compounds are alternatives (e.g. where the tungsten is at a plus six oxidation state).

A surfactant such as an anionic surfactant or a non-ionic surfactant can also be used with such bleaching systems, as can the usual chelating agents (e.g. EDTA), dyes, and fragrances.

In the preferred "bleaching system" the activator and the peroxide are separately stored prior to use. In one container there can be an alkaline stabilized solution of hydrogen peroxide, and in another container the activator can be stored prior to use. Alternatively, the activator can be stored in one container in an alkaline solution, and hydrogen peroxide can be stored in a separate container (as standard, mildly acidic hydrogen peroxide). Where the peroxide generator and activator are both solids they can be stored together.

In yet another form, the invention provides a method of bleaching an organic stain (e.g. fungus/mold) that is present on a surface. One applies the above bleaching system to the stain in a solution that has a pH that is above 7.0 (preferably between 8.0 and 10.99). The activator reacts with the hydrogen peroxide to generate singlet oxygen in the solution, which in turn bleaches the stain.

In addition to other cleaning applications, the bleaching system can be used to bleach paper pulp products and textiles (including fabrics and carpeting), such as those containing cotton and/or artificial fibers such as nylon and polyester.

The peroxide and the activator are preferably mixed in a molar ratio from 20:1 to 1:2, with the most preferred embodiments having at least an excess of the peroxide. When water is pre-added (e.g. when the activator and peroxide are separately stored as liquids), it is preferred to use deionized water to avoid the inclusion of stray transition metal ions. The activator can be 0.1%–10% of the system (by weight), preferably 1%–3%. Even more activator can be added, but this may undesirably raise the cost of the bleach.

Preferred surfactants are non-ionic surfactants such as the Neodols from Shell Chemical. However, a wide variety of other surfactants should also be useful.

Surfactants that may be employed in the present invention include anionic, nonionic and amphoteric surfactants, and mixtures thereof. Suitable anionic surfactants include alpha olefin sulfonates, the alkyl aryl sulfonic acids and their alkali metal and alkaline earth metal salts such as sodium dodecyl benzene sulfonate, magnesium dodecyl benzene sulfonate, disodium dodecyl benzene disulfonate and the like, as well as the alkali metal salts of fatty alcohol esters of sulfuric and sulfonic acids, the alkali salts of alkyl aryl (sulfothioic acid) esters, alkyl thiosulfuric acid and soaps such as coco or tallow, etc. Other anionics include sodium dodecyl benzene sulfonate available under the tradename Nacconal 40-G from Stepan Company, Northfield, Ill., and sodium lauryl sulfate also from the Stepan Company.

Nonionic surfactants include the ethylene oxide esters of alkyl phenols such as (nonylphenoxy) polyoxyethylene ether, the ethylene oxides esters of fatty alcohols such as tridecyl alcohol polyoxyethylene ether, the propylene oxide ethers of fatty alcohols, the ethylene oxide ethers of alkyl mercaptans such as dodecyl mercaptan polyoxyethylene thioester, the ethylene oxide esters of acids such as the lauric ester of methoxy polyethylene glycol, the ethylene oxide ethers of fatty acid amides, the condensation products of ethylene oxide with partial fatty acid esters of sorbitol such as the lauric ester of sorbitan polyethylene glycol ether, and other similar materials.

Amphoteric surfactants include the fatty imidazolines, such as 2-coco-1 hydroxyethyl-1 carboxymethyl-1hydroxylimidazoline and similar compounds made by reacting monocarboxylic fatty acids having chain lengths of 10 to 24 carbon atoms with 2-hydroxy ethyl ethylene diamine and with monohalo monocarboxylic fatty acids.

An additional class of surfactants are amine oxides which demonstrate cationic surfactant properties in acidic pH and nonionic surfactant properties in alkaline pH. Example amine oxides include alkyl dimethyl amine oxide, dihydroxyethyl cocamine oxide, tallowamidopropylamine oxide and lauramine oxide.

The invention can bleach out a wide variety of organic stains on a wide variety of surfaces (e.g. plumbing fixtures, floors, walls, countertops). However, as noted below, the bleaching systems of the invention are particularly effective in bleaching mold/fungus caused discolorations on ceramic tile and plastic.

The objects of the present invention therefore include providing a bleaching system of the above kind:

(a) having desirable stability characteristics;

(b) having excellent stain removal capability; and (c) which is relatively inexpensive to produce.

These and still other objects and advantages of the present invention (e.g. methods for using such bleaching systems) will be apparent from the description which follows. The following description is merely of the preferred embodiments. Thus, the claims should be looked to in order to understand the full scope of the invention.

BEST MODES FOR CARRYING OUT THE INVENTION

Tile Experiments

Solution A is 0.1 g tungstosilicic acid and 9.9 g deionized $H_2O$.

Solution B is 10 g of 6% $H_2O_2$ and 0.5 g of 2.5M NaOH.

Solution C is 6% $H_2O_2$.

Solution D is 0.1 g of sodium tungstate and 9.9 g of deionized water.

Experiment 1

10 g of Solution A was mixed with 6 g of Solution B. A 1 ml sample of the resulting mixture (approximately pH 8.5) was placed onto a mold stained ceramic tile (stained by spraying on an aspergillus niger spore suspension). The stained (medium brown) tile color was bleached white within two minutes.

Experiment 2

10 g of Solution A was mixed with 6 g of Solution B. A 1 ml sample of the mixture (approximately pH 8.5) was applied to a mold stained plastic shower curtain, where the mold had been naturally grown. The surface was bleached completely (to the eye) within five minutes of application.

Experiments 3/4

10 g of Solution C was mixed with 10 g of Solution D. The resulting solution was pH 8.0. The above mixture was then applied to the same types of stained tiles and plastic as in Experiments 1 and 2. The tiles and curtain were bleached completely within less than two minutes.

It should be appreciated that the above experiments merely describe preferred forms of the invention. Other forms of the invention are also possible. For example, surfactants, fragrance, dyes and other conventional additives can be included. Also, suitable thickener compositions can be incorporated.

INDUSTRIAL APPLICABILITY

The bleaching systems of the present invention can be used in connection with cleaning tiles, countertops, and the like prior to sale (at a factory or at an industrial plant). It may also have utility as a hard surface cleaner in certain building applications. Also, the systems can be used to bleach textile or paper products.

We claim:

1. A method for bleaching an organic stain that is present on a solid hard surface, said method comprising:

preparing an aqueous bleaching system consisting essentially of peroxide, a tungsten containing activator for said peroxide, and an optional surfactant; said aqueous bleaching system is prepared by mixing together a separately stored aqueous solution of peroxide with a separately stored aqueous solution of tungsten containing activator selected from the group consisting of sodium tungstate and tungstosilicic acid, whereby said activator comprises from 0.1% to 10% by weight of said system, and the molar ratio of said peroxide to said activator in said system is from about 20:1 to about 1:2, and the pH of said system is between 8.0 and 10.99; and applying said bleaching system to said stain.

2. A method as set forth in claim 1, wherein said peroxide is selected from the group consisting of hydrogen peroxide and hydrogen peroxide generators selected from the group consisting of perborates, percarbonates, peroxyurea compounds, persilic acid, and hydrogen peroxide adducts of pyrophosphates, citrates, sodium sulfate, urea and sodium silicate, and mixtures thereof.

3. A method as set forth in claim 2, wherein said bleaching system further comprises a base selected from the group consisting of alkali metal hydroxides, alkali metal carbonates, alkali metal borates, alkali metal phosphates, alkali metal citrates, organo carboxylated citrates, ammonia, and alkali metal salts of polyacrylic acid.

4. A method as set forth in claim 2, wherein said bleaching system further comprises a surfactant.

* * * * *